United States Patent
Lutz et al.

(10) Patent No.: US 10,160,169 B1
(45) Date of Patent: Dec. 25, 2018

(54) SYSTEMS AND METHODS OF FORMING A COMPOSITE LAYUP STRUCTURE

(71) Applicant: General Electric Company, Schenectady, NY (US)

(72) Inventors: Andreas Lutz, Bavaria (DE); Sultan Shair, Bavaria (DE); Thomas Kluge, Bavaria (DE)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/632,524

(22) Filed: Jun. 26, 2017

(51) Int. Cl.
| | |
|---|---|
| B32B 38/10 | (2006.01) |
| B29C 70/34 | (2006.01) |
| B29C 70/38 | (2006.01) |
| B32B 7/14 | (2006.01) |
| B32B 3/26 | (2006.01) |
| B32B 43/00 | (2006.01) |
| B29K 105/00 | (2006.01) |

(52) U.S. Cl.
CPC .............. *B29C 70/34* (2013.01); *B29C 70/38* (2013.01); *B32B 3/263* (2013.01); *B32B 7/14* (2013.01); *B32B 43/006* (2013.01); *B29K 2105/256* (2013.01); *Y10T 156/1168* (2015.01); *Y10T 156/1978* (2015.01); *Y10T 156/1989* (2015.01)

(58) Field of Classification Search
CPC ............. B32B 43/006; Y10T 156/1168; Y10T 156/1978; Y10T 156/1989; C09J 2205/302
See application file for complete search history.

(56) References Cited

U.S. PATENT DOCUMENTS

| | | | | |
|---|---|---|---|---|
| 3,640,562 | A | * | 2/1972 | Creskoff ............... B66C 1/0281 248/363 |
| 3,833,251 | A | * | 9/1974 | Creskoff ................. B66F 9/181 294/189 |
| 4,931,341 | A | * | 6/1990 | Haffer .................... B65G 47/91 209/905 |

(Continued)

FOREIGN PATENT DOCUMENTS

| | | |
|---|---|---|
| EP | 2474410 A1 | 7/2012 |
| WO | 2015145407 A1 | 10/2015 |

OTHER PUBLICATIONS

Bjornsson, A. et al., "Automated Removal of Prepreg Backing Paper—A Sticky Problem," SAE Technical Paper published Sep. 7, 2013, 9 pp.

*Primary Examiner* — Mark A Osele
(74) *Attorney, Agent, or Firm* — GE Global Patent Operation; Nitin Joshi

(57) ABSTRACT

A layup system for use in forming a composite layup structure from a plurality of plies of composite material, wherein an outermost ply of composite material has a removable film adhered thereto. The system includes a robotic device and an end effector coupled to the robotic device. The end effector includes a layer of compressible material configured to compress the plurality of plies of composite material together when positioned over the composite layup structure. The end effector further includes a first suction device configured to grip the removable film adhered to the outermost ply of composite material. The robotic device is configured to translate the end effector relative to the composite layup structure such that the removable film is peeled from the outermost ply of composite material while the first suction device grips the removable film.

19 Claims, 4 Drawing Sheets

(56) References Cited

U.S. PATENT DOCUMENTS

| | | | |
|---|---|---|---|
| 5,290,386 A | 3/1994 | Trudeau | |
| 5,704,673 A * | 1/1998 | Reckart | B65H 3/0883 |
| | | | 271/90 |
| 5,879,040 A * | 3/1999 | Nagai | F16B 47/00 |
| | | | 279/3 |
| 6,641,131 B2 | 11/2003 | Stohr et al. | |
| 6,893,070 B2 * | 5/2005 | Baker | B25J 15/0052 |
| | | | 294/188 |
| 8,551,380 B2 | 10/2013 | Hawkins et al. | |
| 8,574,388 B2 | 11/2013 | Colombo et al. | |
| 8,826,957 B2 | 9/2014 | Shair et al. | |
| 8,900,391 B2 | 12/2014 | Silcock et al. | |
| 2012/0330453 A1 | 12/2012 | Samak et al. | |
| 2014/0029926 A1 | 1/2014 | Costanzo et al. | |
| 2014/0238617 A1 | 8/2014 | Shair et al. | |

* cited by examiner

SYSTEMS AND METHODS OF FORMING A COMPOSITE LAYUP STRUCTURE

BACKGROUND

The present disclosure relates generally to manufacturing composite structures and, more specifically, to systems and methods of forming a composite layup structure with an integral ply compaction and film removal tool.

Composite laminate components generally include a plurality of layers or plies of composite material assembled together to provide the composite component with improved engineering properties. Composite components are typically manufactured by stacking a plurality of plies on top of each other until a desired thickness and shape is achieved. For example, the manufacturing process typically includes cutting plies of composite material to a desired shape, stacking the plies layer by layer, and compacting the plies after each additional ply is layered over the previously stacked plies. The plies of composite material may be produced with a removable polyfilm that extends over at least one side of the plies, and that facilitates maintaining separation between stacked plies in storage. During manufacture of composite components, the polyfilm is removed from the plies of composite material before a subsequent ply is stacked on top of the previously layered ply. Removal of the polyfilm after each ply has been stacked can be a time-consuming and laborious task.

BRIEF DESCRIPTION

In one aspect, a layup system for use in forming a composite layup structure from a plurality of plies of composite material, wherein an outermost ply of composite material has a removable film adhered thereto, is provided. The system includes a robotic device and an end effector coupled to the robotic device. The end effector includes a layer of compressible material configured to compress the plurality of plies of composite material together when positioned over the composite layup structure. The end effector further includes a first suction device configured to grip the removable film adhered to the outermost ply of composite material. The robotic device is configured to translate the end effector relative to the composite layup structure such that the removable film is peeled from the outermost ply of composite material while the first suction device grips the removable film.

In another aspect, an end effector for use in forming a composite layup structure from a plurality of plies of composite material, wherein an outermost ply of composite material has a removable film adhered thereto, is provided. The end effector includes a rigid plate and a layer of compressible material coupled to the rigid plate. The layer of compressible material is configured to conform to a contour of the composite layup structure, and is configured to compress the plurality of plies of composite material together, when positioned over the composite layup structure. A first suction device is coupled to the rigid plate. The first suction device is configured to grip the removable film adhered to the outermost ply of composite material such that the removable film is peelable from the outermost ply of composite material when the end effector translates relative to the composite layup structure while the first suction device grips the removable film.

In yet another aspect, a method of forming a composite layup structure from a plurality of plies of composite material, wherein an outermost ply of composite material has a removable film adhered thereto, is provided. The method includes positioning an end effector over the composite layup structure, wherein the end effector includes a layer of compressible material and a first suction device. The method also includes applying pressure to the composite layup structure with the end effector such that the layer of compressible material conforms to a contour of the composite layup structure, and such that the layer of compressible material compresses the plurality of plies of composite material together. The method further includes gripping the removable film with the first suction device, and translating the end effector relative to the composite layup structure such that the removable film is peeled from the outermost ply of composite material while the first suction device grips the removable film.

DRAWINGS

These and other features, aspects, and advantages of the present disclosure will become better understood when the following detailed description is read with reference to the accompanying drawings in which like characters represent like parts throughout the drawings, wherein.

Figure 1:
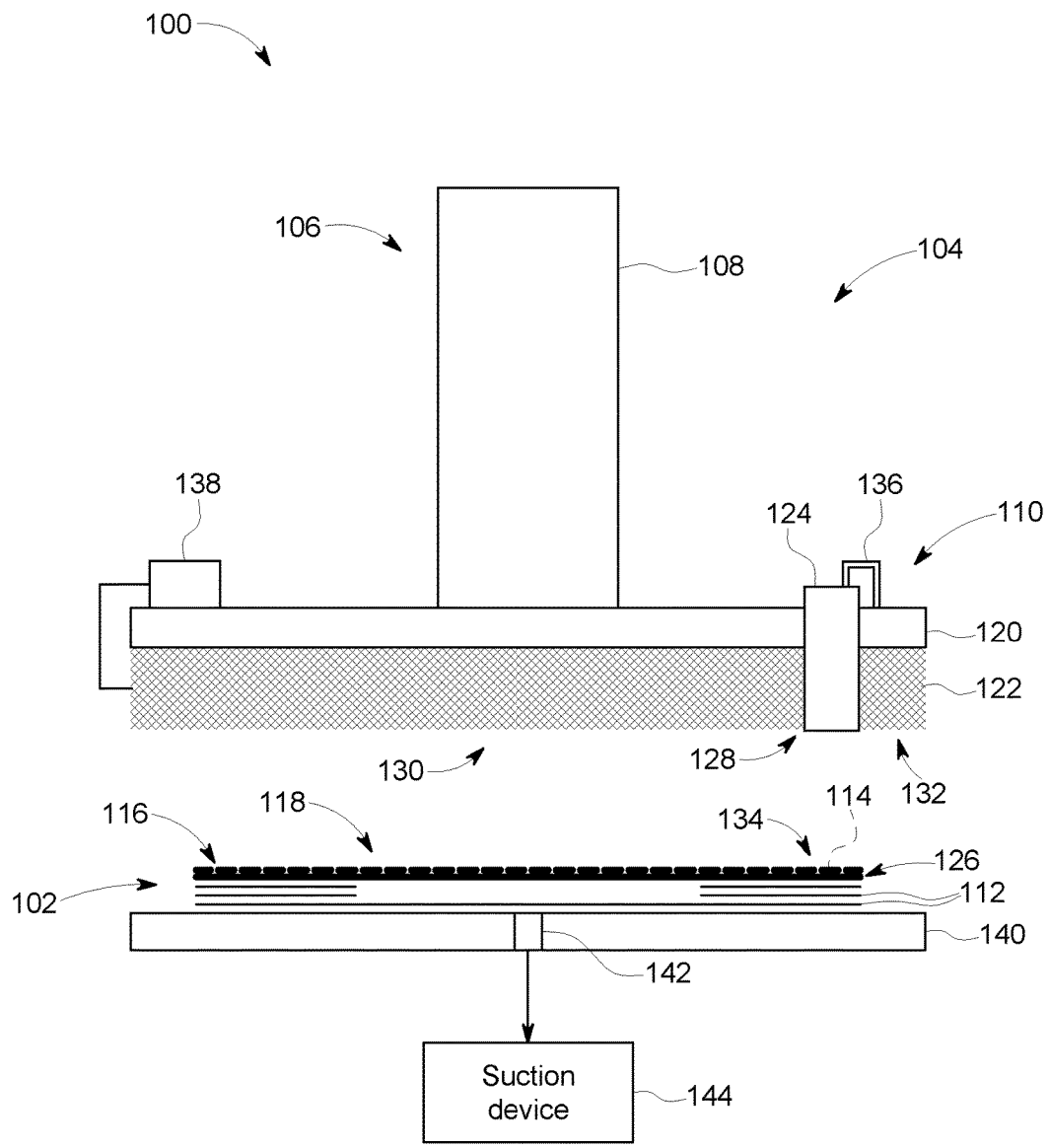
FIG. 1 is a cross-sectional view of an exemplary layup system that may be used to form a composite layup structure, the layup system in a first operational position.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

Embodiments of the present disclosure relate to systems and methods of forming a composite layup structure with an integral ply compaction and film removal tool. More specifically, the systems described herein include an automated robotic device and an end effector that includes the integral ply compaction and film removal tool. The end effector may be affixed to a robotic arm or a gantry system, for example. The end effector includes a layer of compressible material that facilitates compressing plies of composite material together when positioned over the composite layup structure. The end effector further includes a suction device that engages a removable film on an outermost ply of composite material as the layer of compressible material compresses the plies of composite material together. The suction device is then actuated to grip the removable film, and the robotic device is operable to translate the end effector relative to the composite layup structure after compression of the plies has been achieved. More specifically, the robotic device translates the end effector to peel the removable film from the outermost ply of composite material while the suction device continues to grip the removable film. As such, ply compaction and film removal may be achieved in the same robotic sequence, thereby reducing the manufacturing time of the composite layup structure.

FIG. 1 is a cross-sectional view of an exemplary layup system 100 that may be used to form a composite layup structure 102. In FIG. 1, layup system 100 is in a first operational position 104. In the exemplary embodiment, layup system 100 includes a robotic device 106, including a robotic arm 108, and an end effector 110 coupled to robotic arm 108 of robotic device 106. As will be explained in more detail below, robotic device 106 is programmed to enable end effector 110 to perform a ply compaction and film removal operation on composite layup structure 102.

In the exemplary embodiment, composite layup structure 102 is formed from a plurality of plies 112 of composite material. The plurality of plies 112 of composite material are stacked layer by layer to facilitate forming composite layup structure 102. In addition, each ply 112 of composite material has a removable film 114 adhered thereto that is removed prior to layering an additional ply 112 on an outermost ply of composite material, as will be explained in more detail below. In one embodiment, the plurality of plies 112 of composite material are stacked unevenly such that composite layup structure 102 has a non-uniform thickness. For example, composite layup structure 102 includes a thick portion 116 and a thin portion 118, where thick portion 116 includes more plies 112 of composite material than thin portion 118. As such, composite layup structure 102 has an uneven contour, and end effector 110 is designed to compensate for contours in composite layup structure 102 when compressing plies 112 laid up therein, as will be explained in more detail below.

In the exemplary embodiment, end effector 110 includes a rigid plate 120, a layer 122 of compressible material coupled to rigid plate 120, and a first suction device 124 coupled to rigid plate 120. Rigid plate 120 provides support for layer 122 of compressible material during operation of layup system 100. The compressible material is any material that enables layup system 100 to function as described herein. In one embodiment, the compressible material is configured to conform to a contour of composite layup structure 102 when positioned over composite layup structure 102 to compress plies 112. As such, layer 122 of compressible material is capable of applying a compression force across a whole area of composite layup structure 102 even when plies 112 are stacked unevenly therein. In addition, in one embodiment, the compressible material has a compressibility such that a compression force applied to composite layup structure 102 by end effector 110 increases at a substantially linear rate as end effector 110 is displaced towards and biased against composite layup structure 102. An example compressible material includes, but is not limited to, a foam material. In addition, the rate of compression force versus displacement of the compressible material varies based on the type of compressible material used by end effector 110.

As noted above, end effector 110 includes first suction device 124 coupled to rigid plate 120. First suction device 124 is selectively operable, and positioned, to grip removable film 114 adhered to outermost ply 126 of composite material. For example, in one embodiment, layer 122 of compressible material has an opening 128 defined therein. First suction device 124 is sized for insertion within opening 128 such that first suction device 124 is positioned for gripping removable film 114. Moreover, layer 122 of compressible material is defined by a central portion 130 and an outer edge portion 132. Opening 128 is defined in outer edge portion 132 such that first suction device 124 is likewise positioned at outer edge portion 132 of layer 122 of compressible material. As such, as will be explained in more detail below, first suction device 124 is positioned for gripping a peripheral edge 134 of outermost ply 126, which enables end effector 110 to initiate separation of removable film 114 from outermost ply 126. In an alternative embodiment, end effector 110 includes any device or component capable of selectively gripping and releasing removable film 114.

Layup system 100 further includes a biasing mechanism 136 coupled to first suction device 124. In operation, biasing mechanism 136 facilitates translating first suction device 124 relative to end effector 110. For example, biasing mechanism 136 facilitates positioning first suction device 124 for engagement with removable film 114, and also facilitates translation of first suction device 124 in a direction away from removable film 114 as end effector 110 is biased towards composite layup structure 102. Example biasing mechanisms include, but are not limited to, a spring actuation device and a pneumatic actuation device.

Layup system 100 further includes a heater 138 thermally coupled to layer 122 of compressible material. Heater 138 increases a temperature of layer 122 of compressible material such that an adhesive in plies 112 of composite material is activated when contacted by layer 122 of compressible material. As such, plies 112 of composite material at least partially adhere to each other. Heater 138 is selectively actuated when an ambient temperature is below a threshold for activating the adhesive.

In one embodiment, layup system 100 includes a work surface 140 having at least one aperture 142 defined therein. In the exemplary embodiment, composite layup structure 102 is positioned over the at least one aperture 142. A second suction device 144 is in communication with the at least one aperture 142, and second suction device 144 is operable to hold composite layup structure 102 in position on work surface 140. More specifically, in operation, the suction force induced by second suction device 144 is greater than the suction force induced by first suction device 124. As such, second suction device 144 facilitates holding composite layup structure 102 in position as removable film 114 is separated and peeled from outermost ply 126.

In operation, the plurality of plies 112 of composite material are stacked on work surface 140 to facilitate forming composite layup structure 102. Second suction device 144 draws a vacuum through the at least one aperture 142 such that composite layup structure 102 is held on work surface 140. In addition, in first operational position 104, robotic device 106 positions end effector 110 over composite layup structure 102.

Figure 2:
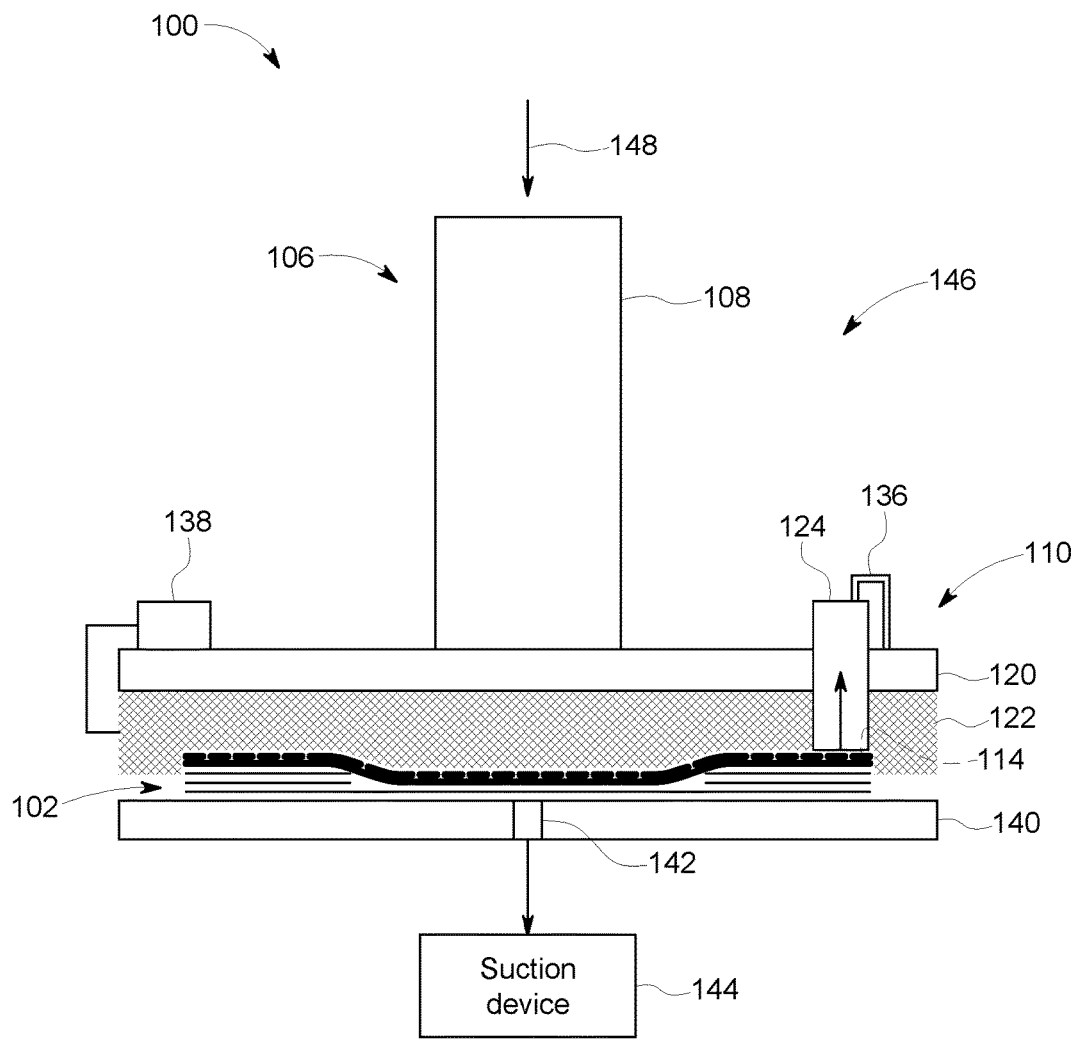
FIG. 2 is a cross-sectional view of the layup system shown in FIG. 1 in a second operational position.

FIG. 2 is a cross-sectional view of layup system 100 in a second operational position 146. In operation, robotic device 106 translates end effector 110 in a first direction 148 towards work surface 140 such that pressure is applied to composite layup structure 102. When end effector 110 is positioned over composite layup structure 102, layer 122 of compressible material conforms to a contour of composite layup structure 102, and layer 122 of compressible material compresses the plurality of plies 112 of composite material together. First suction device 124 is then activated to grip removable film 114 adhered to outermost ply 126. Moreover, in some embodiments, heater 138 is activated to facilitate activating the adhesive in plies 112 when an ambient temperature is less than a predetermined threshold.

Figure 3:
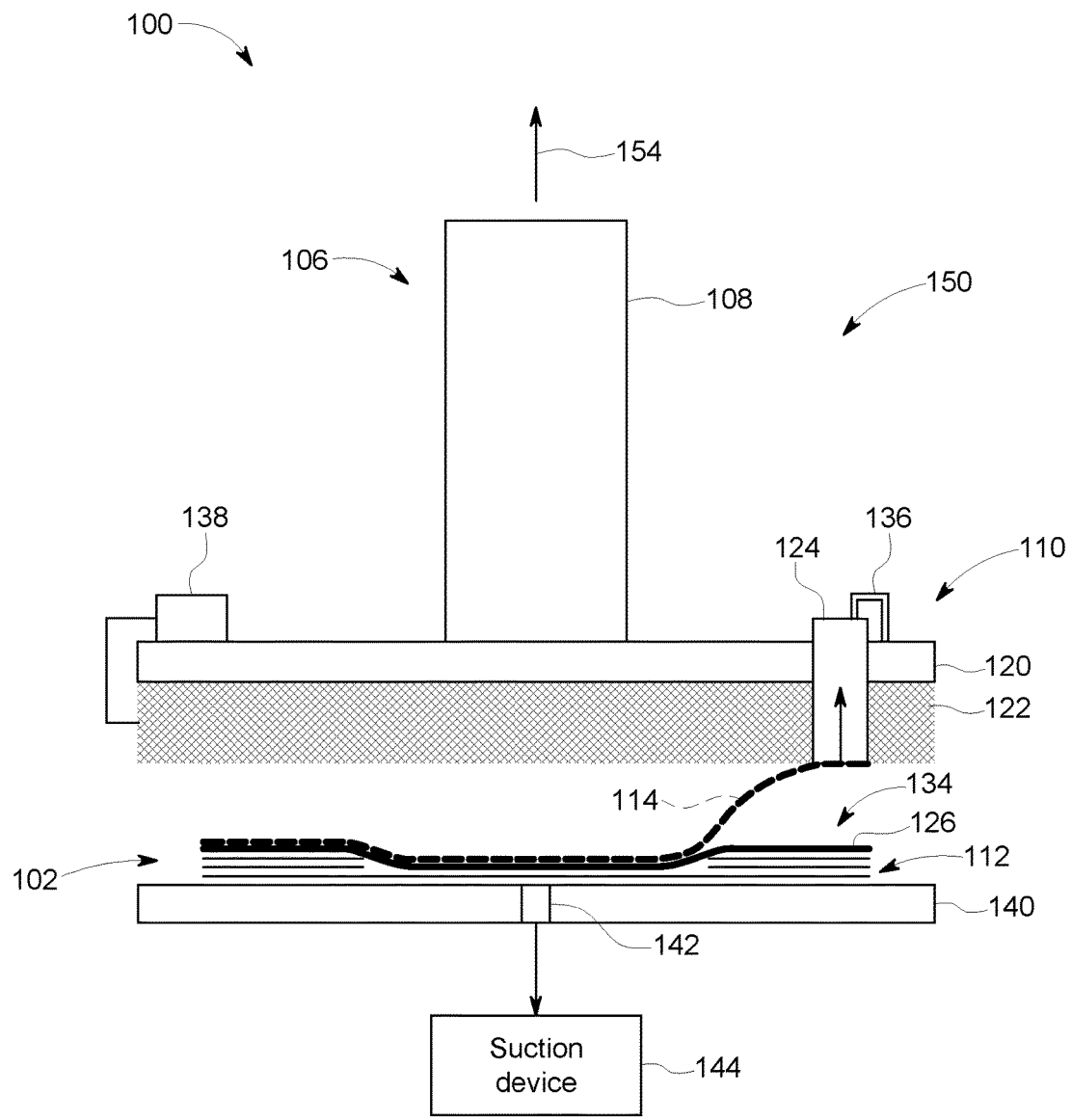
FIG. 3 is a cross-sectional view of the layup system shown in FIG. 1 in a third operational position.
Figure 4:
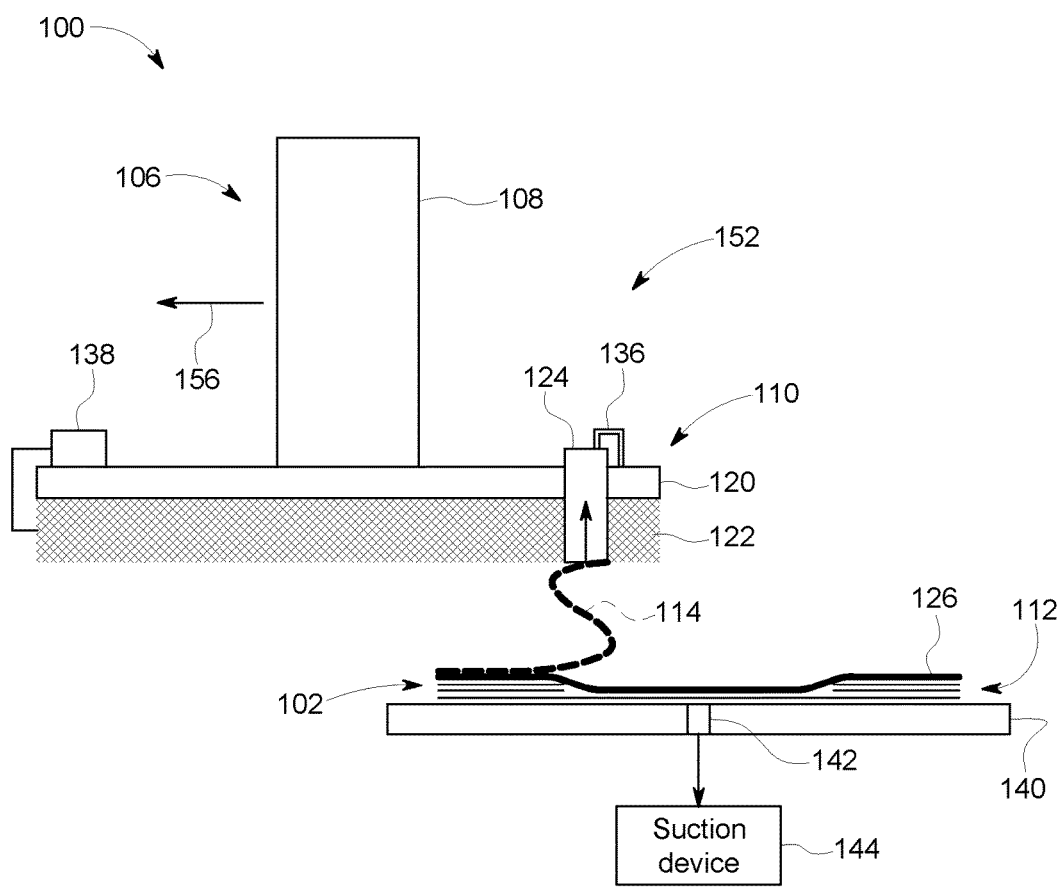
FIG. 4 is a cross-sectional view of the layup system shown in FIG. 1 in a fourth operational position.

FIGS. 3 and 4 are cross-sectional views of layup system 100 in a third operational position 150 and a fourth operational position 152. In operation, robotic device 106 translates end effector 110 relative to composite layup structure 102 such that removable film 114 is peeled from outermost ply 126 of composite material while first suction device 124 continues to grip removable film 114. More specifically, referring to FIG. 3, robotic device 106 translates end effector 110 in a second direction 154, away from work surface 140, to initiate separation of removable film 114 from outermost ply 126 at peripheral edge 134 thereof. In one embodiment, robotic device 106 translates end effector 110 away from work surface 140, towards work surface 140, and away from work surface 140 a second time to facilitate ensuring removable film 114 has been effectively separated from outermost ply 126. Referring to FIG. 4, robotic device 106 then translates end effector 110 in a third direction 156, different from second direction 154 (e.g., substantially perpendicular to second direction 154), to peel removable film 114 from outermost ply 126 of composite material. Once removed, additional plies 112 of composite material are layered until composite layup structure 102 is formed from a predetermined number of plies 112.

An exemplary technical effect of the systems and methods described herein includes at least one of: (a) removing a polyfilm from a composite ply in a quick and efficient manner; (b) reducing the manufacturing time of a composite layup structure; and (c) providing a tool that enables ply compaction and polyfilm removal in the same robotic sequence.

Exemplary embodiments of a layup system are provided herein. The systems and methods are not limited to the specific embodiments described herein, but rather, components of systems and/or steps of the methods may be utilized independently and separately from other components and/or steps described herein. For example, the configuration of components described herein may also be used in combination with other processes, and is not limited to practice with only removing a polyfilm from composite plies, as described herein. Rather, the exemplary embodiment can be implemented and utilized in connection with many applications where removing a film from a sheet of material is desired.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A layup system for use in forming a composite layup structure from a plurality of plies of composite material, wherein an outermost ply of composite material has a removable film adhered thereto, said system comprising:
   a robotic device; and
   an end effector coupled to said robotic device, said end effector comprising:
     a layer of compressible material configured to compress the plurality of plies of composite material together when positioned over the composite layup structure; and
     a first suction device configured to grip the removable film adhered to the outermost ply of composite material, wherein said robotic device is configured to translate said end effector relative to the composite layup structure such that the removable film is peeled from the outermost ply of composite material while said first suction device grips the removable film.

2. The system in accordance with claim 1, wherein said end effector further comprises a rigid plate coupled to said layer of compressible material.

3. The system in accordance with claim 1, wherein said layer of compressible material has an opening defined therein, and wherein said first suction device is sized for insertion within said opening such that said first suction device is positioned for gripping the removable film.

4. The system in accordance with claim 1, wherein said layer of compressible material is defined by a central portion and an outer edge portion, and wherein said first suction device is positioned at said outer edge portion of said layer of compressible material.

5. The system in accordance with claim 1 further comprising a biasing mechanism coupled to said first suction device, wherein said biasing mechanism is configured to translate said first suction device relative to said end effector.

6. The system in accordance with claim 1, wherein the plurality of plies of composite material are stacked unevenly such that the composite layup structure has a non-uniform thickness, and wherein said layer of compressible material is configured to conform to a contour of the composite layup structure when positioned over the composite layup structure.

7. The system in accordance with claim 1, wherein said robotic device is configured to translate in a first direction to initiate separation of the removable film from the outermost ply of composite material, and wherein said robotic device is configured to translate in a second direction, different from the first direction, to peel the removable film from the outermost ply of composite material.

8. The system in accordance with claim 1 further comprising a heater thermally coupled to said layer of compressible material, wherein said heater is configured to increase a temperature of said layer of compressible material.

9. The system in accordance with claim 1 further comprising:
a work surface having at least one aperture defined therein, wherein the composite layup structure is positionable over said at least one aperture; and
a second suction device in communication with said at least one aperture, wherein said second suction device is configured to hold the composite layup structure in position on said work surface.

10. An end effector for use in forming a composite layup structure from a plurality of plies of composite material, wherein an outermost ply of composite material has a removable film adhered thereto, said end effector comprising:
a rigid plate;
a layer of compressible material coupled to said rigid plate, wherein said layer of compressible material is configured to conform to a contour of the composite layup structure, and is configured to compress the plurality of plies of composite material together, when positioned over the composite layup structure; and
a first suction device coupled to said rigid plate, wherein said first suction device is configured to grip the removable film adhered to the outermost ply of composite material such that the removable film is peelable from the outermost ply of composite material when the end effector translates relative to the composite layup structure while said first suction device grips the removable film;
wherein said layer of compressible material has an opening defined therein, and wherein said first suction device is sized for insertion within said opening such that said first suction device is positioned for gripping the removable film.

11. The end effector in accordance with claim 10, wherein said layer of compressible material is defined by a central portion and an outer edge portion, and wherein said first suction device is positioned at said outer edge portion of said layer of compressible material.

12. The end effector in accordance with claim 10 further comprising a biasing mechanism coupled to said first suction device, wherein said biasing mechanism is configured to bias said first suction device against the removable film.

13. The end effector in accordance with claim 10 further comprising a heater thermally coupled to said layer of compressible material, wherein said heater is configured to increase a temperature of said layer of compressible material.

14. A method of forming a composite layup structure from a plurality of plies of composite material, wherein an outermost ply of composite material has a removable film adhered thereto, said method comprising:
positioning an end effector over the composite layup structure, wherein the end effector includes a layer of compressible material and a first suction device;
applying pressure to the composite layup structure with the end effector such that the layer of compressible material conforms to a contour of the composite layup structure, and such that the layer of compressible material compresses the plurality of plies of composite material together;
gripping the removable film with the first suction device; and
translating the end effector relative to the composite layup structure such that the removable film is peeled from the outermost ply of composite material while the first suction device grips the removable film.

15. The method in accordance with claim 14 further comprising orienting the end effector such that the first suction device grips a peripheral edge of the removable film.

16. The method in accordance with claim 14 further comprising heating the layer of compressible material to an increased temperature.

17. The method in accordance with claim 14, wherein translating the end effector comprises:
translating the end effector in a first direction to initiate separation of the removable film from the outermost ply of composite material; and
translating the end effector in a second direction, different from the first direction, to peel the removable film from the outermost ply of composite material.

18. The method in accordance with claim 14 further comprising:
stacking a plurality of plies of composite material on a work surface to form the composite layup structure, wherein the work surface has at least one aperture defined therein, and wherein the plurality of plies are stacked over the at least one aperture; and
drawing a vacuum through the at least one aperture such that the composite layup structure is held on the work surface.

19. The method in accordance with claim 18, wherein stacking a plurality of plies comprises stacking the plurality of plies unevenly such that the composite layup structure has a non-uniform thickness.

* * * * *